May 26, 1970 R. J. NEWTON 3,514,673
REMOTE CONTROLLED RELAY SWITCH
Filed Oct. 26, 1967
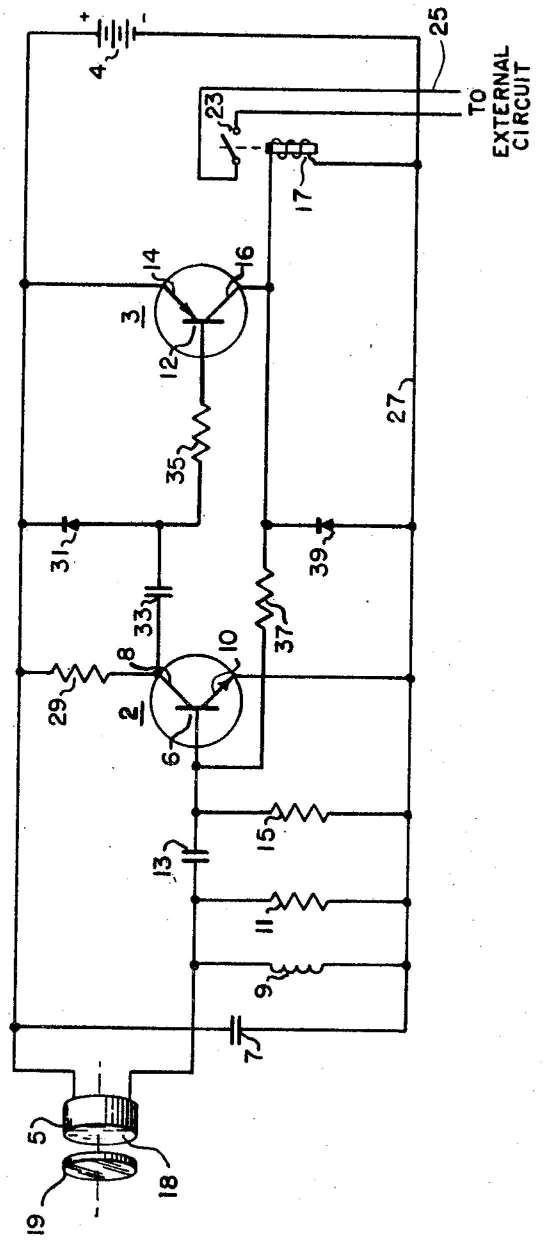
INVENTOR,
RICHARD J. NEWTON.
BY Harry M. Saragovitz,
Edward J. Kelly, Herbert Berl
& Julian C. Keppler
ATTORNEYS.

United States Patent Office 3,514,673
Patented May 26, 1970

3,514,673

REMOTE CONTROLLED RELAY SWITCH

Richard J. Newton, Wall Township, Monmouth County, N.J., assignor to the United States of America as represented by the Secretary of the Army Filed Oct. 26, 1967, Ser. No. 678,460
Int. Cl. H01h 47/24, 47/32
U.S. Cl. 317—130 1 Claim

ABSTRACT OF THE DISCLOSURE

A remote controlled relay switch which responds to quickly pulsed light signals. A photosensitive element placed in the base circuit of a complementary monostable multivibrator provides pulses to trigger the multivibrator in response to momentary illumination of the photosensitive element. A reversal of state of the multivibrator energizes a relay coil which in turn actuates contacts in an external circuit. The particular circuit configuration makes possible an extremely long ready-to-respond state with only minimal transistor power supply requirements.

The invention described herein may be manufactured, used, and licensed by or for the Government for governmental purposes without the payment to me of any royalty thereon.

The present invention relates to control devices and particularly to light-sensitive remote-controlled relay switches.

Switching devices operated by light-triggering signals are commonly known and widely varied in design. The present invention, however, was developed to provide certain specific improvements over these previously developed systems. These were, first, sensitivity to short pulses of monochromatic light emanating from transmitters a large distance from the receiver and second, the capability of remaining in a passive state for exceptionally long periods of time with only minimal transistor bias battery requirements.

Therefore, an object of this invention is to provide a device which may be left unattended for long intervals of the order of 6 months at any time during which it may accept and respond to triggering pulses.

Another object of the invention is to ensure reaction to extremely short pulses of monochromatic light, directed at the device from large distances.

A feature of the invention is its relative simplicity of design utilizing a minimum of components rendering the device small, lightweight, and inexpensive. These qualities combine to make the device ideal for applications in areas requiring disposable apparatus either as a result of abandonment or destruction, e.g., as explosive detonators.

Another feature of the invention is its automatic reset capability. The circuit, as designed, will automatically reopen the relay switch a preset length of time after it was closed in response to the triggering pulse of light.

Still another feature is the device's security from interference both man-made and natural. The type of input pulse, use of both an electrical and an optical filter and a small acceptance angle (determined by the area of the optical filter or the photosensitive surface) maintain system integrity against spurious signals.

Briefly stated, the circuit of this invention accepts a filtered pulsed light input signal and causes the closing of a normally open relay switch in response to that input pulse. A laser transmitter emits pulses of monochromatic light of sufficient power and in the proper direction to impinge on the photosensitive device of this invention. The photosensitive device forms part of the circuit of a complementary monostable multivibrator. A pulsed light of acceptable characteristics incident on the photosensitive device triggers the multivibrator which, in turn, produces a pulse in its output. This output pulse energizes a relay coil which closes a switch completing a connection in an external circuit.

The specific nature of the invention, as well as other advantages and objects thereof, will be clearly apparent from a description of a typical embodiment as shown in the accompanying drawing, in which the single figure is a schematic diagram of the circuit of the invention.

This invention is illustrated as being constituted by a first transistor, NPN transistor 2 having a base 6, a collector 8 and an emitter 10. Emitter 10 is connected to the common neutral or ground conductor 27. The resistor 15 is connected between base 6 and common neutral or ground conductor 27. Base 6 is also connected to the low voltage side of the capacitor 13 which serves as a high pass electrical filter to incoming signals. The inductor 9 and the resistor 11 are connected in parallel between the high voltage side of capacitor 13 and common neutral or ground conductor 27. The high voltage terminal of the photodiode 5 is connected to the high voltage side of capacitor 13. The optical filter 19 is situated directly in front of the photosensitive surface 18 of photodiode 5. Details of the optical filter are well known in prior art and form no part of the present invention. The capacitor 7 is connected between the negative terminal of photodiode 5 and common neutral or ground conductor 27.

A second transistor, the PNP transistor 3 has a base 12, a collector 16 and an emitter 14. Base 12 of PNP transistor 3 is connected to collector 8 of NPN transistor 2 through the resistor 35 and the capacitor 33 in that order. At the junction of the resistor 35 and capacitor 33 is connected the positive terminal of the diode 31. The negative terminal is connected directly to emitter 14 of PNP transistor 3 and indirectly, through the resistor 29, to collector 8 of NPN transistor 2. Base 6 of NPN transistor 2 is connected to collector 16 of PNP transistor 3 through the resistor 37. The low voltage terminal of the diode 39 is connected to the junction of resistor 37 and collector 16, and the high-voltage terminal is connected to common neutral or ground conductor 27.

Actuating winding 17 of an electromagnetic relay is connected between collector 16 and common neutral or ground conductor 27. The drawing shows relay contact 23 in the normally open position interrupting the external circuit conductor 25. Power supply 4 is connected between emitter 14 of PNP transistor 3 and common neutral or ground conductor 27.

In one typical embodiment which has been constructed, the magnitude and types of components used in the circuit were as follows:

| Element: | Type or value |
|---|---|
| NPN transistor 2 | 2N2475. |
| PNP transistor 3 | SCL 7007/116. |
| Power supply 4 | BA–1318A/U (5.57). |
| Photodiode 5 | SD–100. |
| Capacitor 7 | 0.1 microfarad. |
| Optical filter 19 | #70 Wratten filter. |
| Inductor 9 | 470 millihenries. |
| Resistor 11 | 15 kilohms. |
| Capacitor 13 | 100 picofarads. |
| Resistor 15 | 5 kilohms. |
| Resistor 29 | 5 kilohms. |
| Diode 31 | IN 458. |
| Capacitor 33 | 33 microfarads. |
| Resistor 35 | 1 kilohm. |
| Resistor 37 | 1 kilohm. |
| Diode 39 | IN 251. |

In order that the operation of this appaartus may be more fully understood, it is deemed desirable to trace the various circuits appearing therein. Thus, it is seen that the light responsive variable impedance device photodiode 5 in conjunction with inductor 9 constitutes a voltage divider. In the stable state, NPN transistor 2 and PNP transistor 3 are normally in cutoff. Since no current flows through either transistor, the voltage at collector 8 of NPN transistor 2 is the voltage of power supply 4. As a pulse of light illuminates photosensitive surface 18 of photodiode 5 the impedance of photodiode 5 decreases and consequently the voltage across inductor 9 increases. If the incoming signal is D-C, from a constant light source, or even low frequency A-C, from a 60 cycle light source, it will be shorted to ground through the inductor 9 or blocked from the transistor base by the capacitor 13. This voltage increase across inductor 9 appears directly at base 6 of NPN transistor 2, turning NPN transistor 2 "on," As current flows in NPN transistor 2, the decrease in voltage level at collector 8 is coupled through capacitor 33 and resistor 35 to base 12 of PNP transistor 3. This decrease in voltage at base 12 brings PNP transistor 3 out of cutoff. Current then flows from emitter 14 to base 12 of PNP transistor 3 and through resistor 35 and capacitor 33 resulting in a buildup of charge on capacitor 33. As current flows through PNP transistor 3, voltage also increases across diode 39. This voltage increase is fed back through resistor 37 to base 6 maintaining NPN transistor 2 in saturation. When capacitor 33 is completely charged, base 12 is again positive and PNP transistor 3 enters its cutoff region. As PNP transistor 3 turns "off" voltage across diode 39 and, consequently at base 6, diminishes turning NPN transistor 2 "off." The circuit is once again in its stable state with both transistors "off." Diode 31, which is forward biased as a result of the charge on capacitor 33 and the voltage level at collector 8, allows capacitor 33 to discharge thus returning the circuit to its original state.

As voltage builds up across diode 39, current is induced in actuating winding 17, causing relay contact 23 to close completing a connection in external circuit conductor 25.

I claim:

1. Apparatus for controlling the flow of current at a first location in response to light energy radiated from a second location comprising a high-pass electrical filter, an optical filter, a source of unidirectional potential, having a positive and negative terminal, the positive terminal of which is connected to a voltage divider consisting of a photosensitive variable impedance device and an inductor, an NPN transistor having base, collector and emitter electrodes, means including said high pass electrical filter for connecting the junction of the photosensitive variable impedance and the inductor to the base of the NPN transistor, resistive means connecting the collector of the NPN transistor through a resistor to the positive terminal of the source of unidirectional potential, a PNP transistor having base, collector and emitter electrodes, means connecting the collector of the NPN transistor to the base of the PNP transistor means connecting the emitter of the PNP transistor to the positive terminal of the source of unidirectional potential, resistive means connecting the collector of the PNP transistor to the base of the NPN transistor, a diode having a high voltage terminal and a low voltage terminal, means connecting the high voltage terminal of the diode to the negative terminal of the source of unidirectional potential and means connecting the low voltage terminal of the diode to the collector of the PNP transistor, an electromagnetic relay switch having an actuating winding, connected from the junction of the diode and the collector of the PNP transistor and the negative terminal of the source of unidirectional potential.

References Cited

UNITED STATES PATENTS

| | | | |
|---|---|---|---|
| 2,852,702 | 9/1958 | Pinckaers. | |
| 2,971,134 | 2/1961 | Cockrell | 317—124 |
| 3,151,281 | 9/1964 | Kuehn | 317—130 |
| 3,377,507 | 4/1968 | Riebs | 307—311 |

LEE T. HIX, Primary Examiner

A. D. PELLINEN, Assistant Examiner

U.S. Cl. X.R.

250—214; 307—117; 317—148.5